United States Patent
Suh et al.

(10) Patent No.: US 8,833,533 B2
(45) Date of Patent: Sep. 16, 2014

(54) ULTRA SLIM POWER SUPPLY DEVICE AND POWER ACQUISITION DEVICE FOR ELECTRIC VEHICLE

(75) Inventors: Nam Pyo Suh, Daejeon (KR); Soon Heung Chang, Daejeon (KR); Dongho Cho, Daejeon (KR); Gyu Hyeong Cho, Daejeon (KR); Chun Taek Rim, Daejeon (KR); Jung Goo Cho, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 177 days.

(21) Appl. No.: 13/262,879

(22) PCT Filed: Mar. 5, 2010

(86) PCT No.: PCT/KR2010/001376
§ 371 (c)(1),
(2), (4) Date: Jan. 20, 2012

(87) PCT Pub. No.: WO2010/117139
PCT Pub. Date: Oct. 14, 2010

(65) Prior Publication Data
US 2012/0103741 A1    May 3, 2012

(30) Foreign Application Priority Data
Apr. 6, 2009 (KR) .......... 10-2009-0029671

(51) Int. Cl.
*B60L 9/00* (2006.01)
*B60L 11/18* (2006.01)
*B60L 11/00* (2006.01)

(52) U.S. Cl.
CPC ......... *B60L 11/1816* (2013.01); *B60L 2200/26* (2013.01); *B60L 2200/18* (2013.01); *B60L 2200/12* (2013.01); *B60L 11/1803* (2013.01); *Y02T 10/7005* (2013.01); *Y02T 90/121* (2013.01); *B60L 2200/36* (2013.01); *B60L 11/007* (2013.01); *Y02T 10/7088* (2013.01); *Y02T 90/14* (2013.01); *B60L 2200/22* (2013.01)
USPC ............................................. 191/10; 104/281

(58) Field of Classification Search
USPC ...................... 191/2, 3, 4, 5, 6, 10, 22 R, 23 R
See application file for complete search history.

(56) References Cited

U.S. PATENT DOCUMENTS 3,914,562 A * 10/1975 Bolger ............................ 191/10
4,331,225 A *  5/1982 Bolger ............................ 191/10
(Continued)

FOREIGN PATENT DOCUMENTS

| JP | 11-054349 A | 2/1999 |
| KR | 10-2005-0106313 A | 11/2005 |
| KR | 10-0875945 B1 | 12/2008 |

OTHER PUBLICATIONS

International Search Report for PCT/KR2010/001376 mailed Oct. 11, 2010.

*Primary Examiner* — Jason C Smith
(74) *Attorney, Agent, or Firm* — Wolf, Greenfield & Sacks, P.C.

(57) ABSTRACT

An ultra slim power supply device for supplying power to an electric vehicle in a contactless manner includes at least one power supply track buried in a road. Each power supply track includes a plate-shaped magnetic core extending along the road, a plate or strip shaped magnetic field generator arranged above the magnetic core through which an alternating current is supplied to generate a magnetic field, a plate or strip shaped insulating body positioned between the magnetic core and the magnetic field generator to isolate them from each other, and a housing for enclosing the magnetic core, the magnetic field generator and the insulating body.

8 Claims, 8 Drawing Sheets

(56) References Cited

U.S. PATENT DOCUMENTS

| | | | | |
|---|---|---|---|---|
| 4,476,947 | A * | 10/1984 | Rynbrandt | 180/2.1 |
| 4,742,283 | A * | 5/1988 | Bolger et al. | 318/587 |
| 4,800,328 | A * | 1/1989 | Bolger et al. | 320/106 |
| 4,836,344 | A * | 6/1989 | Bolger | 191/10 |
| 5,669,470 | A * | 9/1997 | Ross | 191/10 |
| 5,821,728 | A * | 10/1998 | Schwind | 320/108 |
| 6,089,362 | A * | 7/2000 | Takasan et al. | 191/10 |
| 6,101,952 | A * | 8/2000 | Thornton et al. | 104/282 |
| 6,421,600 | B1 * | 7/2002 | Ross | 701/117 |
| 6,471,020 | B1 * | 10/2002 | Hernandez | 191/2 |
| 6,753,666 | B2 * | 6/2004 | Fischperer | 318/135 |
| 6,879,889 | B2 * | 4/2005 | Ross | 701/22 |
| 7,825,537 | B2 * | 11/2010 | Freer | 307/42 |
| 8,360,216 | B2 * | 1/2013 | Meins et al. | 191/10 |
| 2003/0200025 | A1 * | 10/2003 | Ross | 701/200 |
| 2005/0178632 | A1 * | 8/2005 | Ross | 191/10 |
| 2006/0138857 | A1 | 6/2006 | Nakayama et al. | |
| 2008/0129246 | A1 * | 6/2008 | Morita et al. | 320/108 |
| 2012/0055751 | A1 * | 3/2012 | Vollenwyder et al. | 191/10 |
| 2012/0103741 | A1 * | 5/2012 | Suh et al. | 191/10 |

* cited by examiner

ULTRA SLIM POWER SUPPLY DEVICE AND POWER ACQUISITION DEVICE FOR ELECTRIC VEHICLE

RELATED APPLICATIONS

This application is a U.S. National Stage application based on International Application No. PCT/KR2010/001376, filed Mar. 5, 2010, which claims priority to Korean Application No. 10-2009-0029671, filed Apr. 6, 2009.

TECHNICAL FIELD

The present invention relates to an ultra slim power supply device and a power acquisition device for an electric vehicle. More particularly, it relates to an electric power delivery system for transferring power in a non-contact manner from a power supply device installed in a road to a power acquisition device mounted on an electric vehicle when they are brought in a close proximity.

BACKGROUND ART

As is well known, conventional battery-powered electric vehicles have a number of shortcomings including: the necessity of employing a plurality of large size batteries, increased weight compromising the fuel efficiency and entailing a higher production cost of the vehicles, prolonged battery charging time, low charging efficiency and relatively short battery lifespan. To overcome these problems, there have been proposed a number of power delivery systems that make use of electromagnetic induction technology.

However, there have been difficulties in applying the electromagnetic induction technology to practical use. Since motor vehicles using an energy source other than electric power also run on a public road, there are practical difficulties to construct a groove or install a rail on the road, thereby requiring the surface of the power supply coil to be flush with the road. In addition, the gap or transverse alignment between the power acquisition coil and the electric power supply coil may fluctuate with the varying weights of vehicles or rocking motions thereof.

In an effort to deal with some of the problems mentioned above, a research team of University of California at Berkeley, called PATH (Partners for Advanced Transit and Highways), has developed a power delivery system. Unfortunately, the system developed by PATH has a power transfer efficiency of about 60% even if the gap or transverse deviation between a power acquisition coil and an electric power supply coil is set to as small as 2 to 3 inches. The power supply coil has a width of about 100 cm and is buried in a road. To operate such power delivery system however, the cost required in building a road infrastructure therefor is estimated to be as high as 850,000 to 1,250,000 U.S. dollars per kilometer. Furthermore, the power delivery efficiency of 60% is too low to make the power delivery system practicable. Studies have shown that the power delivery efficiency should be at least 70% and preferably 80% or higher to be commercially viable.

In addition, there are a host of other technical problems to be resolved before a successful application of electromagnetic induction power supply technology to an actual use may be realized.

For instance, care should be taken to ensure that electric power loss attributable to magnetically induced electromotive force or electromagnetic interference does not occur when non-electric vehicles run along the road provided with such a power supply system. In case of the power delivery system developed by PATH, it has been reported that the electric power loss is 200 W/km or more on average. In order to reduce the electric power loss, therefore, it may be inevitable to drastically reduce the width of the power supply coil while increasing the frequency of the source current. Reduction in the width of the electric power supply coil poses a problem, however: for the power delivery characteristics tend to deteriorate as the transverse deviation between the power acquisition coil and the electric power supply coil becomes greater.

Furthermore, in case of the prior art electromagnetic induction-based power delivery system, it is necessary to dig a trench in the road so as to embed therein the power supply system therein including a core module, electric wires, support plate, protection cover and grounding wire, requiring the expenditure of extensive time, effort and monies. To boot, a power supply system having such a complex structure is incapable of enduring the constant running of heavy loads of vehicles thereover for an extended period of time. There may be frequent system down times occasioned by the repairing of the power supply system. Accordingly, there has existed need for an electromagnetic induction power delivery system for use in operating an electric vehicle capable of overcoming the various problems discussed above.

DISCLOSURE OF INVENTION

Technical Problem

In response to the industry s need discussed above, the present invention provides an ultra slim power supply device for use in operating an electric vehicle, which can maintain its width as small as possible and yet permit an increased vertical and transverse deviation between a power acquisition device and the power supply device, which can be readily installed in a road at a low installation cost and which is amenable to an easy repair work.

Another object of the present invention is to provide an ultra slim power acquisition device for use in operating an electric vehicle, to receive power transferred, by electromagnetic induction, from the ultra slim power supply device of the present invention.

Solution to Problem

In accordance with one embodiment of the present invention, there is provided an ultra slim power supply device for supplying power to an electric vehicle in a contactless manner, comprising: at least one power supply track buried in a road, each power supply track including a plate-shaped magnetic core extending along the road, a plate or strip shaped magnetic field generator arranged above the magnetic core through which an alternating current is supplied to generate a magnetic field, and a plate or strip shaped insulating body positioned between the magnetic core and the magnetic field generator to isolate them from each other.

In accordance with another embodiment of the present invention, there is provided an ultra slim power supply device for supplying power to an electric vehicle in a contactless manner, comprising: at least one power supply track including a plate or strip shaped magnetic core extending along a road, the magnetic core having the shape of a square bracket open upward, a magnetic field generator arranged above the magnetic core through which an alternating current is supplied to generate a magnetic field, and an insulating body positioned between the magnetic core and the magnetic field generator to isolate them from each other, wherein the magnetic core is arranged such that two uppermost ends of the magnetic core become coplanar with a surface of the road, and wherein a material having a composition identical to a pavement material of the road is filled in an inner space between the uppermost ends and therebelow.

In accordance with a further embodiment of the present invention, there is provided an ultra slim power acquisition device equipped in an electric vehicle and supplied with electric power by electromagnetic induction from a power supply device extending along a road and having opposite ends, comprising: a magnetic core installed in the electric vehicle in a spaced-apart relationship with the road; and at least one power acquisition coil winding around the magnetic core.

Advantageous Effects of Invention

With the present invention, the power supply device can be manufactured to have an ultra slim integral structure, thereby saving the manufacturing cost. Since the magnetic flux is concentrated on two uppermost ends of the power supply device, the magnetic circuit is maintained even when the power acquisition device is moved in the transverse direction to a great extent. This assists in greatly increasing the permissible vertical and transverse deviation of the power acquisition device.

Inasmuch as the power supply device is bent into a square bracket shape and buried in the road so that only the core of 1 cm or less in width can be exposed on the surface of the road, it is possible to increase the permissible vertical and transverse deviation of the power acquisition device without causing any substantial change in the surface of the road.

In addition, the need to control the transverse position of the power acquisition device can be eliminated by forming the power acquisition device into a flat shape, winding the power acquisition coils on the magnetic core in a spaced-apart relationship and allowing the selected one of the power acquisition coils to collect electric power.

Accordingly, the ultra slim power supply device and power acquisition device of the present invention is suitable for use in an ordinary road.

The ultra slim power supply device and the power acquisition device of the present invention can be used in operating an electric vehicle such as an electric passenger car, an electric bus, an electric truck, a light rail transit, subways, an electric taxi, a plug-in hybrid car, an electric locomotive, a golf cart, an electric bicycle, an electric motorcycle, an automatic in-factory transportation equipment, an automatic airport transportation equipment and the like.

BRIEF DESCRIPTION OF DRAWINGS

The above and other objects and features of the present invention will become apparent from the following description of embodiments given in conjunction with the accompanying drawings, in which.

MODE FOR THE INVENTION

Figure 1:
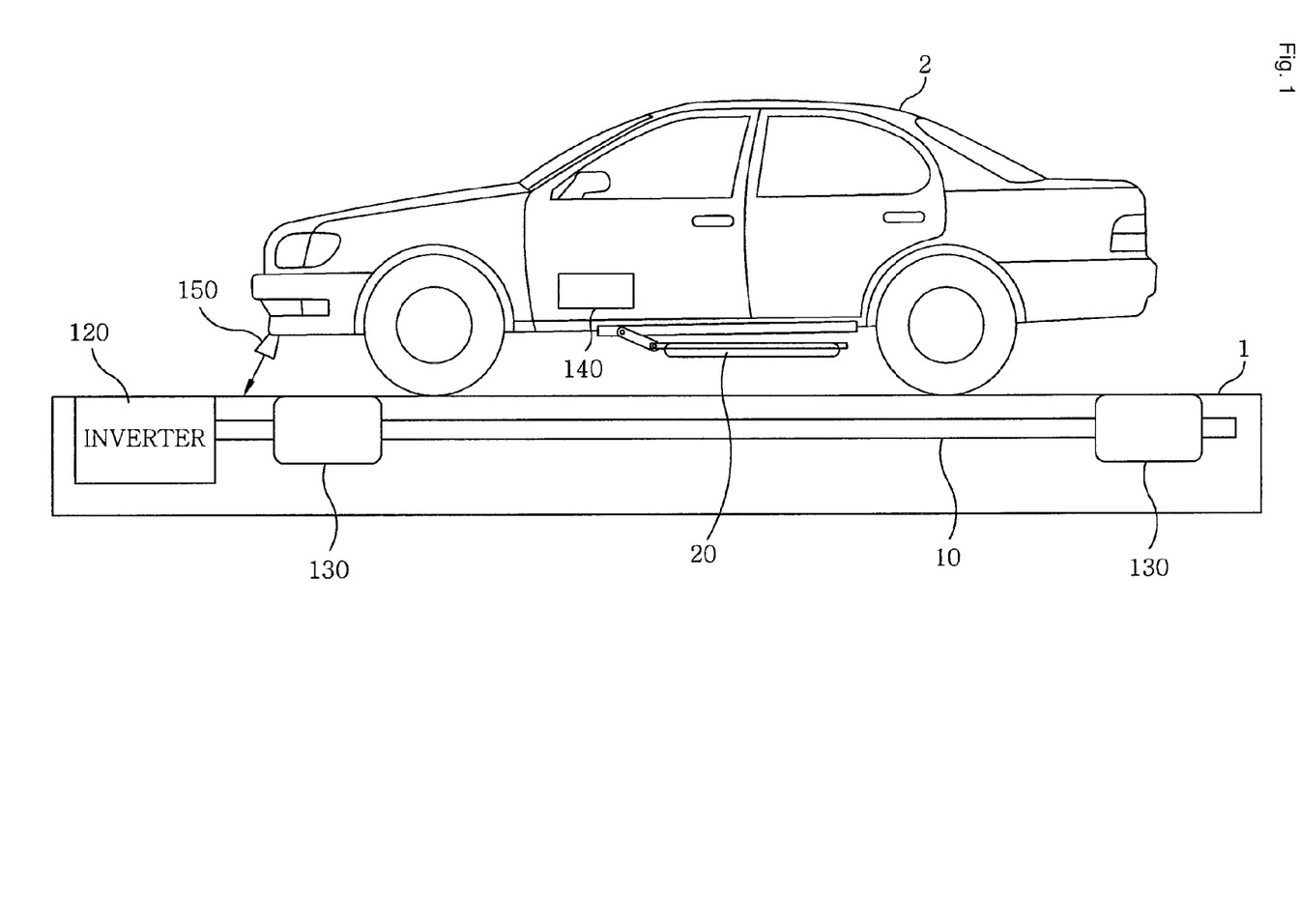
FIG. 1 is a cross-sectional side view showing a typical electromagnetic induction power delivery system for use in operating an electric vehicle.

FIG. 1 schematically shows a typical electromagnetic induction power delivery system for use in operating an electric vehicle.

As shown in FIG. 1, the electromagnetic induction power delivery system includes an electric vehicle 2, a power supply device 10 embedded in a road for supplying electric power, a power acquisition device 20 attached to the electric vehicle for receiving, through electromagnetic induction, the electric power from the power supply device 10, an inverter 120 for applying a high-frequency electric current to the power supply device 10, a pair of electric vehicle sensors 130 installed along the power supply device 10 for generating a detection signal when the electric vehicle is detected in a specified section of the road, a battery 140 mounted in the electric vehicle to be charged by the electric power to mobilize the electric vehicle, and an obstacle sensor 150 for detecting an obstacle present in front of the electric vehicle.

Hereinafter, certain preferred embodiments of the present invention will be described in detail with reference to the accompanying drawings.

Figure 2:
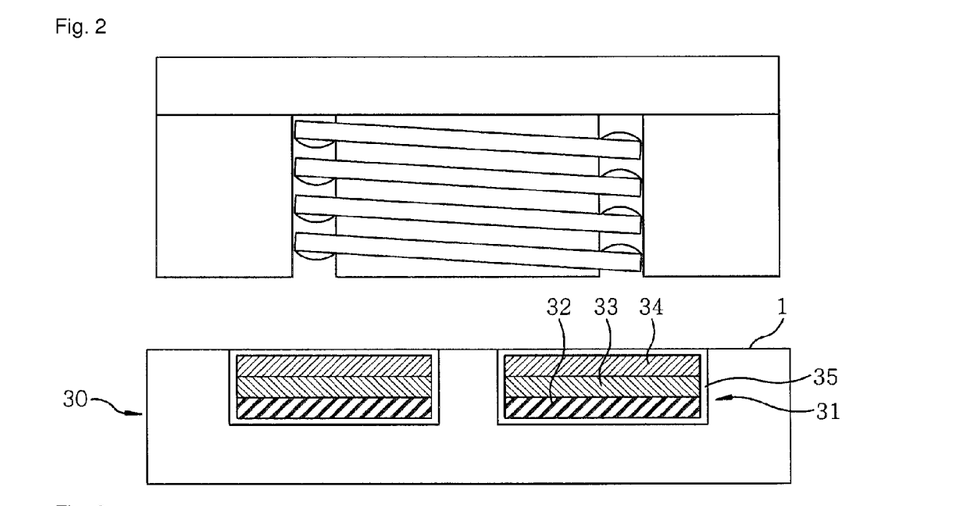
FIG. 2 is a view showing a cross-sectional front view of an ultra slim power supply device in accordance with said one embodiment of the present invention.

Referring now to FIG. 2, there is shown a cross-sectional front view of an ultra slim power supply device in accordance with one embodiment of the present invention which may be used in combination with a conventional power acquisition device. As shown in FIG. 2, the ultra slim power supply device 30 includes a pair of power supply tracks 31. Each of the power supply tracks 31 includes an ultra slim magnetic core 32, an insulating body 33, a magnetic field generator 34 and a housing 35 for accommodating the magnetic core 32, the insulating body 33 and the magnetic field generator 34 laminated one above another. The magnetic core 32 includes a plurality of thin magnetic plates laminated one above another in a mutually insulating relationship. The magnetic field generator 34 includes a plurality of thin conductive plates laminated one above another in a mutually insulating relationship. For example, the magnetic core 32 is formed by laminating amorphous metal plates or silicon steel plates one atop another. The magnetic field generator 34 is formed by litz wires or laminating a plurality of thin conductive plates one above another in a mutually insulating relationship, like laminating copper plates one atop another. The insulating body 33 serves to electrically isolate the magnetic core 32 and the magnetic field generator 34 from each other. The housing 35 is formed by molding or extruding. The housing 35, the insulating body 33 and the fixing pins 37 are preferably made of a bakelite material or polyvinyl chloride.

In particular, one or more power supply tracks 31 are buried in the road in a spaced-apart parallel relationship. The power supply tracks 31 may have a length of several hundred meters, e.g., ranging from 30 to 300 m. The power supply tracks 31 are of an ultra slim structure having a thickness of 1 cm or less and can be buried in an existing asphalt road 1 without having to dig a deep trench. Preferably, the magnetic core 32, the insulating body 33, and the magnetic field generator 31 have a thickness ranging from 1 mm to 20 mm, respectively.

The power supply tracks 31 can be prepared in the form of a roll with a length of several hundred meters. The roll so prepared may be transported to a working site and directly installed in the road without requiring any assembling process.

Figure 3:
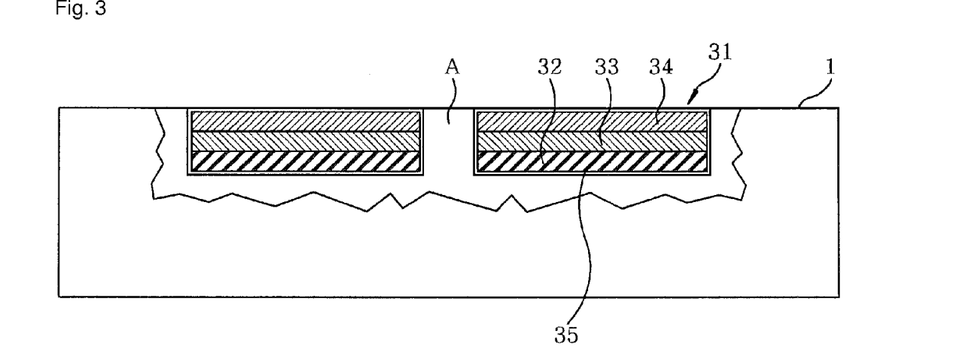
FIGS. 3 and 4 are views illustrating different exemplary methods for installing ultra slim power supply tracks in the road.
Figure 4:
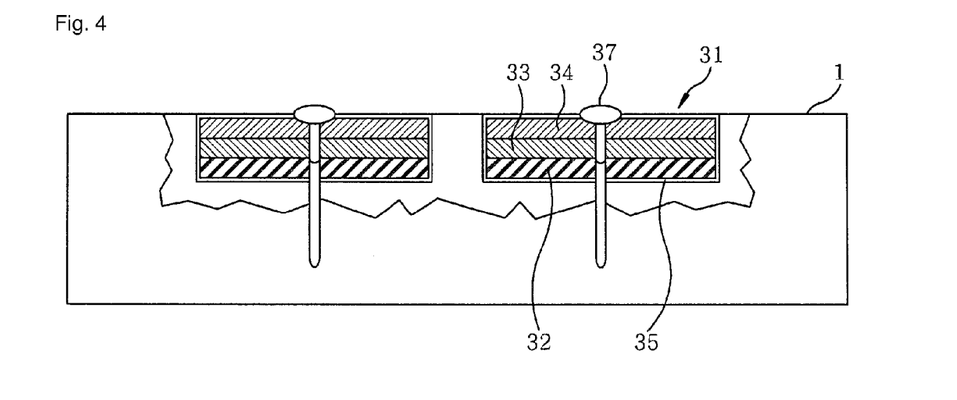

FIGS. 3 and 4 are views illustrating different exemplary methods for installing the ultra slim power supply tracks on the road.

In the coil track installation method illustrated in FIG. 3, the power supply tracks 31 are fixed to the road by means of an adhesive filler material A. In the coil track installation method illustrated in FIG. 4, a plurality of through-holes are formed in the power supply tracks 31 at a predetermined interval along a longitudinal direction of the road and the surfaces of the through-holes are insulated. Then, fixing pins 37 are inserted into the through-holes to fix the power supply tracks 31 to the road, thereby preventing leakage of an electric current. The fixing pins 37 are driven into the road at an interval of, e.g., 1 to 2 m along the longitudinal direction, and practically do not affect any of the power supply characteristics.

Figure 5:
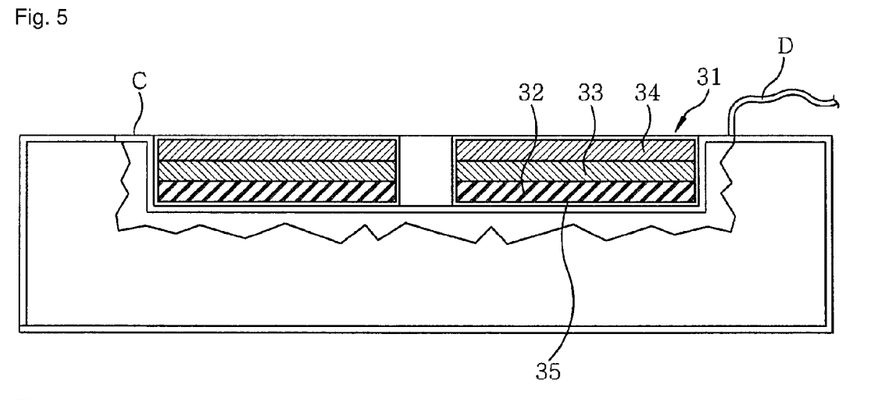
FIGS. 5, 6 and 7 are views illustrating different exemplary methods for reinforcing the strength of the ultra slim power supply tracks.
Figure 6:
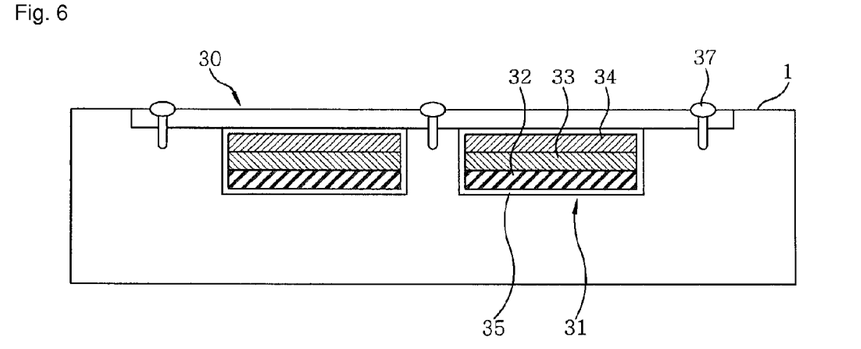
Figure 7:
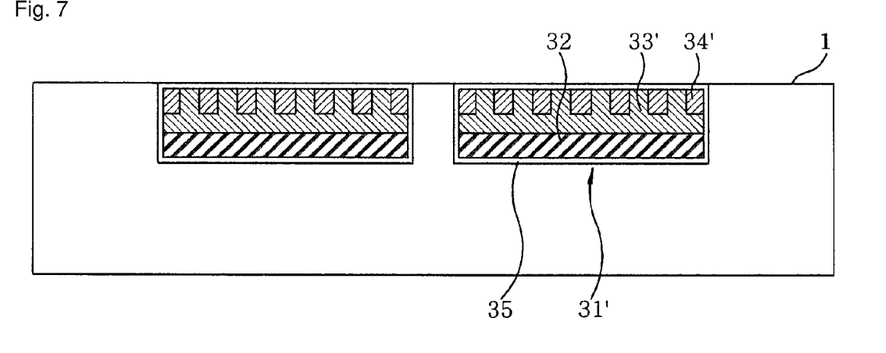

FIGS. 5, 6 and 7 are views illustrating different exemplary methods for reinforcing the strength of the ultra slim power supply tracks.

In the reinforcing method illustrated in FIG. 5, a base plate C of a square bracket shape is installed in the road and then the power supply tracks 31 are placed on the base plate C, thereby preventing the power supply tracks 31 from getting bent because of irregularities on the surface of the road. The base plate C serves to prevent leakage of electricity and magnetic flux and also serves as a conductor connected to a grounding wire D.

In the reinforcing method illustrated in FIG. 6, the ultra slim power supply device 30 includes a pair of power supply coil tracks 31, a protector cover 36 arranged above the power supply coil tracks 31 for protecting them, and a plurality of fixing pins 37 for fixing the protector cover 36 in place. The protector cover 36 is preferably made of a material having a substantially same wear resistance as that of the material used in paving the road, e.g., a reinforced plastic or a bakelite material. The fixing pins 37 may be arranged on the lateral sides of the power supply coil tracks 31 and at the center between them.

FIG. 7 is a view illustrating a modification of power supply tracks for reinforcing them.

The magnetic field generator made of thin laminated plates or a litz wire is relatively weak against repeated heavy loading. If the insulating body is installed near the magnetic field generator along the length direction of a road, the load of the vehicle acts against the insulating body rather than the magnetic field generator, thereby reinforcing the strength of the power supply tracks.

In the modified structure illustrated in FIG. 7, a modified power supply coil tracks 31' includes a modified insulating body 33' and a modified magnetic field generators 34'.

As illustrated in FIG. 7, the modified magnetic field generator of each of the modified power supply tracks 31' is formed of a plurality of power supply lines 34'. The modified insulating body 33' has a plurality of grooves into which each of the plurality of magnetic field generators 34' is inserted and a plurality of protrusions defining the grooves and supporting the load of the vehicles moving along the road 1. Therefore, the load of the vehicle acts against the modified insulating body 33' rather than the modified magnetic field generator 34'.

Figure 8:
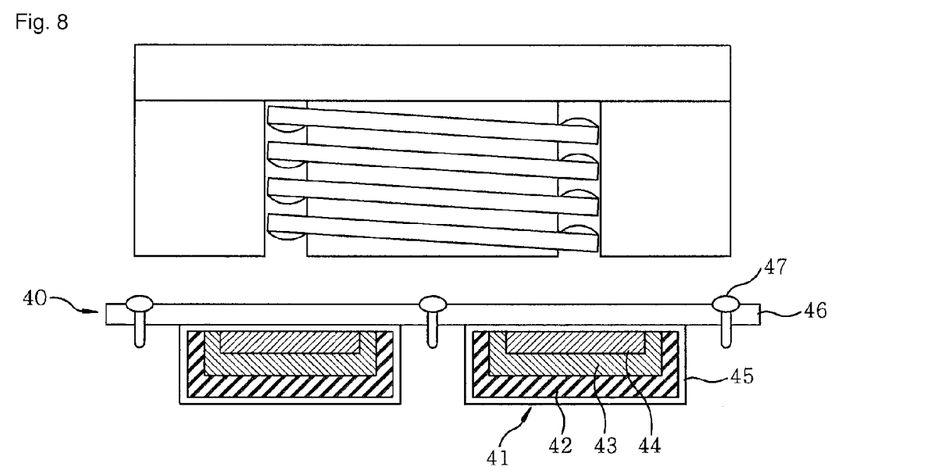
FIG. 8 shows a modification of the ultra slim power supply device shown in FIG. 2.

FIG. 8 shows a modification of the ultra slim power supply device shown in FIG. 2. Referring to FIG. 8, the ultra slim power supply device 40 includes a magnetic core 42 and an insulating body 43 each of which is bent into a square bracket shape, thereby surrounding the magnetic field generator 44. Magnetic fields are on two uppermost ends of the magnetic field generator 44.

Figure 9:
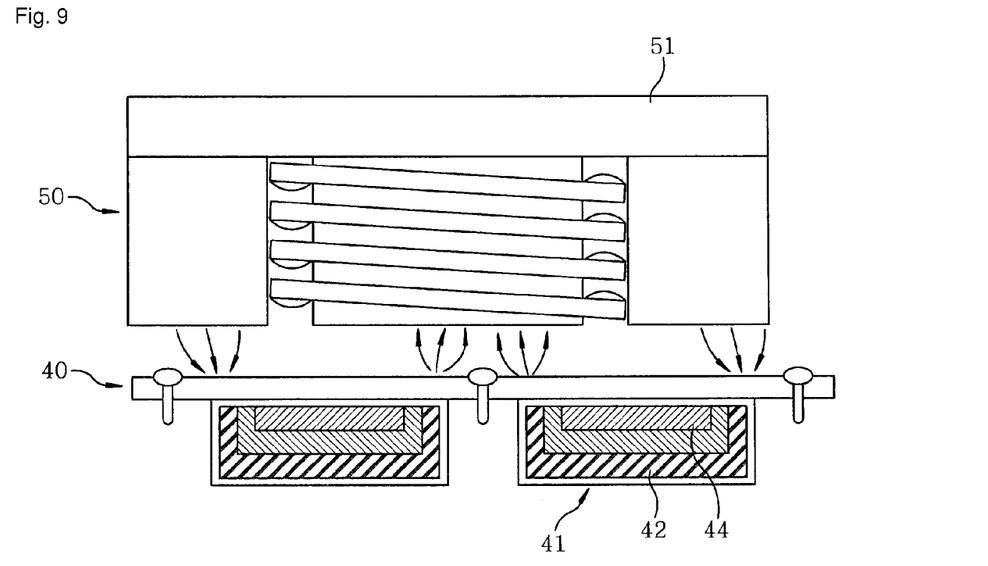
FIGS. 9 and 10 are views illustrating a distribution of magnetic lines in case of using the ultra slim power supply device shown in FIG. 8.
Figure 10:
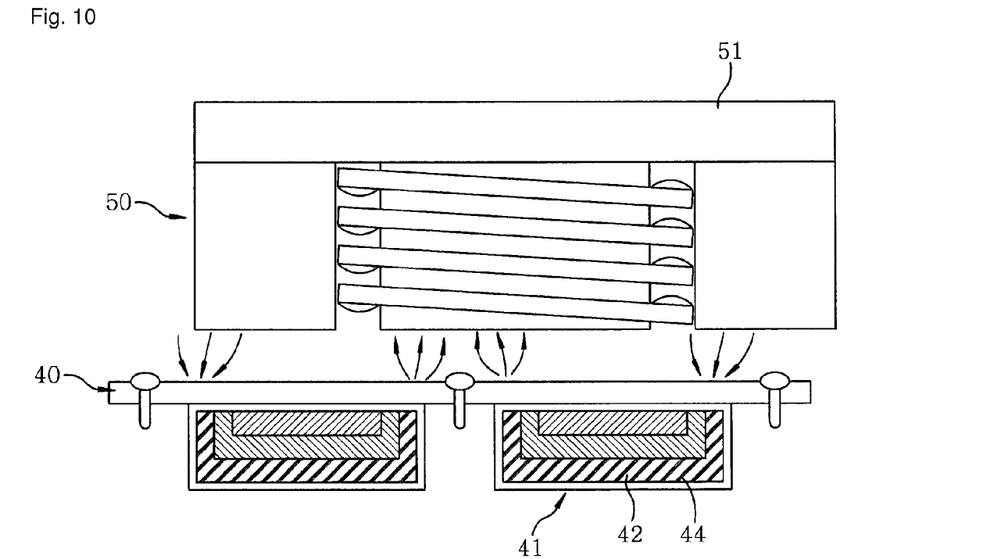

FIGS. 9 and 10 are views illustrating distributions of magnetic lines in case of applying an electric current to the ultra slim power supply device shown in FIG. 8. The magnetic field generators 44 of the power supply device 40 are respectively supplied with electric currents whose flowing directions are opposite to each other.

In case of using the power supply device 40 and the insulating body 43 of a square bracket shape shown in FIG. 8, the magnetic fields are on two uppermost ends of the magnetic field generator 44. This makes it possible to reduce the gap between the cores of an E-shaped core member 51 of a power acquisition device 50 and to increase the width of each of the cores. As an alternating current is applied to the magnetic field generator 44 of the power supply device 40, magnetic fields are concentrated on two uppermost ends of the magnetic field generator 44. Therefore, even when the center lines of the power supply device 40 and the power acquisition device 50 are greatly deviated from each other as illustrated in FIG. 10 or even if the vertical gap between the power supply device 40 and the power acquisition device 50 grows larger, the magnetic field generator 44 can form a closed circuit with the E-shaped core member 51 of the power acquisition device 50 through the magnetic lines.

Figure 11:
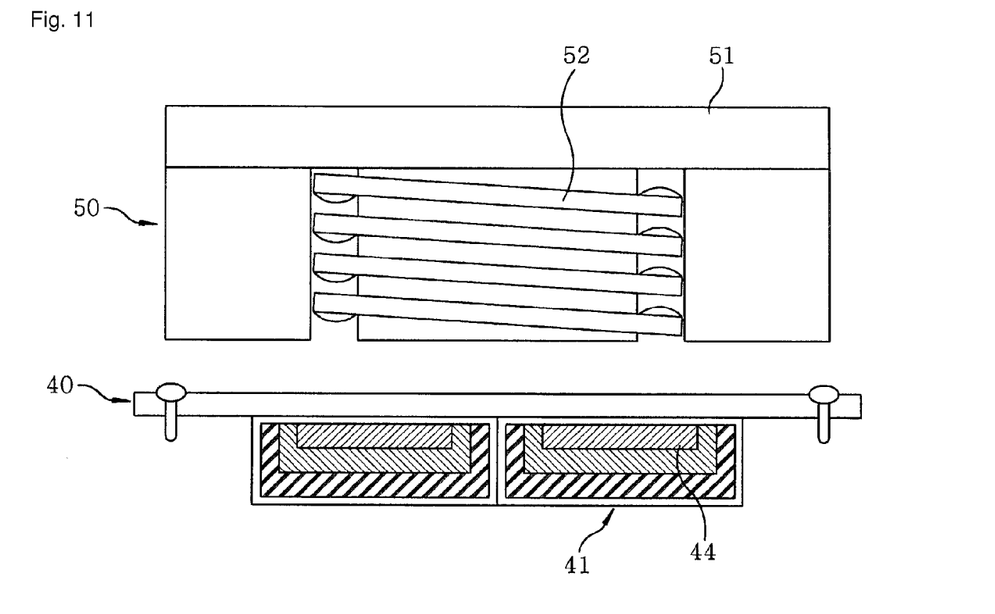
FIG. 11 is a view illustrating an inventive method of minimizing the spacing between the power supply tracks incorporated in the ultra slim power supply device shown in FIG. 8.

FIG. 11 is a view illustrating an inventive method of minimizing the spacing between the power supply tracks incorporated in the ultra slim power supply device 40 shown in FIG. 8. As shown in FIG. 11, the gap between the power supply tracks 41 of the power supply device 40 can be set arbitrarily. Regardless of whether the gap is wide or narrow, there is no problem as long as the width of the central core of the core member 51 of the power acquisition device 50 is changed in conformity with the gap. If the gap between the power supply tracks 41 is minimized as in FIG. 11, it is possible to minimize the width of the core member 51. In this structure, the width of the central core 52 becomes generally equal to the width of the magnetic field generator 44. The permissible transverse deviation between the power supply tracks 41 and the core member 51 becomes equal to one half of the width of the magnetic field generator 44 or the central core 52. For example, if the total width of the power supply tracks 41 is 20 cm, the width of the magnetic field generator 44 or the central core 52 will be approximately 10 cm with the permissible transverse deviation being about 5 cm. When the influence of the thickness of the housing of the power supply tracks 41 and the influence of the thickness of the coil on the central core 52 are taken into account, the width of the magnetic field generator 44 or the central core 52 becomes approximately equal to 9 cm with the permissible transverse deviation being approximately equal to 4 cm. The permissible transverse deviation amounting to one fifth, 4 cm, of the total width, 20 cm, of the power supply tracks 41 is an exceptionally great characteristic in comparison to the conventional power supply devices. The permissible transverse deviation can be increased by increasing the total width of the power supply tracks 41 together with the width of the central core 52.

Figure 12:
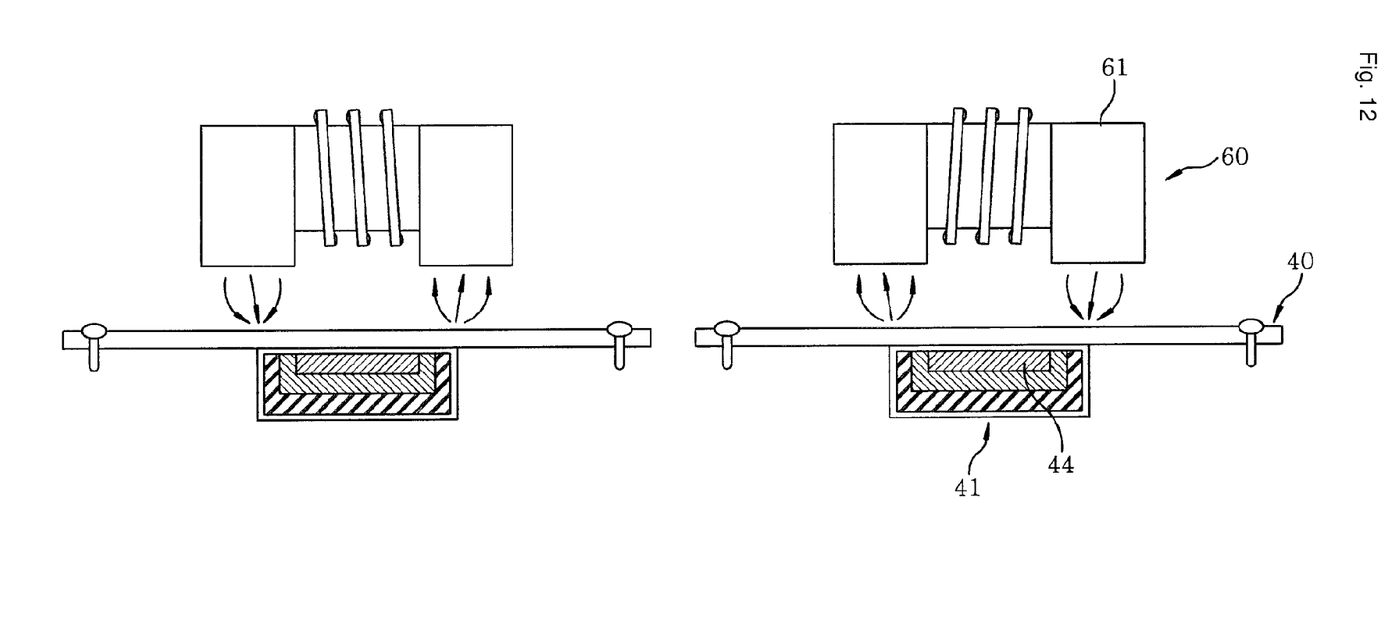
FIG. 12 is a view illustrating an inventive method of maximizing the spacing between the power supply tracks incorporated in the ultra slim power supply device shown in FIG. 8.

FIG. 12 is a view illustrating an inventive method of maximizing the spacing between the power supply tracks 41 incorporated in the ultra slim power supply device 40 shown in FIG. 8. If the gap between the power supply tracks 41 is greatly increased as shown in FIG. 12 or if only one of the power supply tracks 41 is used in delivering the electric power, the magnetic lines concentrated on two uppermost ends of the magnetic field generator 44 will form a closed magnetic circuit with the core member 61 of a square bracket shape, thereby assuring smooth delivery of the electric power. This structure can be cost-effectively applied to a golf course where a long track for supplying a low electric power needs to be installed. The single power supply track is also suitable for use in a road with going and coming lanes or a road with a plurality of lanes extending in one direction. The mono-track type power supply device using the single power supply track makes it possible to set the width of the power supply track twice as great as the width of the power supply tracks employed in a dual-track type power supply device having two power supply tracks. Consequently, this makes it possible to double the permissible transverse and vertical deviations of the power acquisition device 60.

Figure 13:
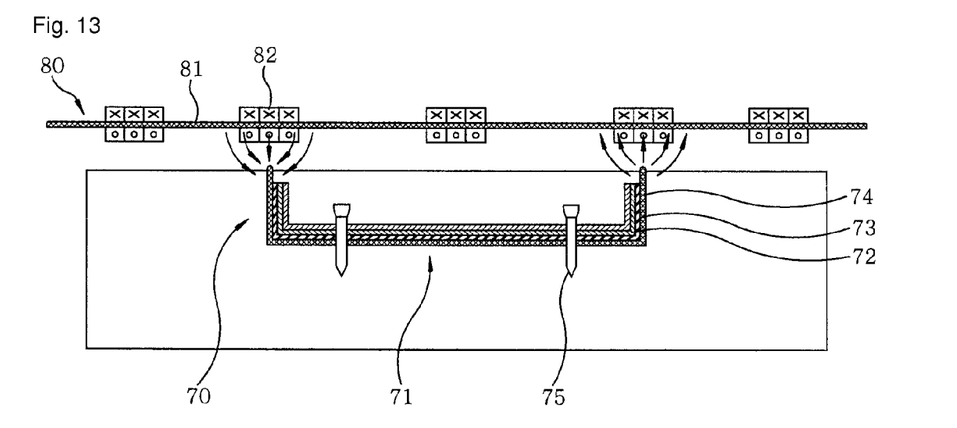
FIG. 13 shows an ultra slim power supply device of a square bracket shape in accordance with said another embodiment of the present invention and an ultra slim power acquisition device in accordance with said further embodiment of the present invention used in combination.

FIG. 13 shows an ultra slim power supply device of a square bracket shape in accordance with said another embodiment of the present invention and an ultra slim power acquisition device in accordance with said further embodiment of the present invention used in combination. Referring to FIG. 13, the ultra slim power supply device 70 of a square bracket shape includes a power supply track 72 of a square bracket shape and a plurality of spikes 75 for fixing the power supply track 71 to a road. The power supply track 71 includes a magnetic core 72 of a square bracket shape and a magnetic field generator 74 encapsulated with an insulating body 73. The magnetic core 72 and the magnetic field generator 74 are arranged to extend along the length of a road and are laminated on above the other. The opposite ends of the magnetic core 72 are coplanar with the surface of the road. In other words, only the opposite ends of the magnetic core 72 is exposed to the surface of the road and the remaining portions are covered with the conventional material of the road, e.g., asphalt or cement. This eliminates the possibility that the friction coefficient of the surface of the road is changed by the presence of a cover of the power supply track 71. The magnetic lines are concentrated on two uppermost ends of the magnetic core 72, which enables the power supply device 70 to form a magnetic circuit effectively with the power acquisition device of an electric vehicle moving over the surface of the road. The magnetic core 72 is preferably made of a material whose wear resistance is equal to or similar to that of the material used in paving the road. This ensures that the opposite ends of the magnetic core 72 are worn at the same wear rate as that of the road, thereby keeping the opposite ends of the magnetic core 72 flush with the surface of the road at all times. In the event that the road is repaved, additional core segments with a length corresponding to the height of the road to be increased by the re-pavement are attached to the opposite ends of the magnetic core 72. Considering that the gap between the power acquisition device 80 and the magnetic core 72 is several centimeters or more, the presence of a small gap or a foreign matter between the magnetic core 72 and the additional core segments does not matter to the power delivery efficiency.

The additional core segments can be attached to the opposite ends of the magnetic core 72 by a method of driving wedge-like core segments between the core plates of the magnetic core 72, a method of driving core segments along the side surfaces of the opposite ends of the magnetic core 72 or a method of merely placing core segments on the opposite ends of the magnetic core 72. Since the ultra slim power supply device is capable of minimizing inductance leakage, it does not matter in practice even if the inductance leakage is slightly increased by the magnetic core 72 being bent into a square bracket shape. Although the foregoing description is directed to a single power supply track, the same effects can be attained in case where a plurality of power supply tracks is employed.

In the meantime, the ultra slim power acquisition device 80 of flat shape includes a plate-shaped magnetic core 81 attached to an electric vehicle in a spaced-apart relationship with the afore-mentioned power supply device 70 and a plurality of power acquisition coils 82 wound around the magnetic core 81 and spaced apart from one another along the magnetic core 81. Attaining a high power transfer efficiency, for each of the power acquisition coils there exists at least one or more power acquisition coils that are placed apart by the distance of the width of the power supply device 71. The magnetic core 81 of flat shape can be extended by the length of an electric vehicle in the transverse direction. By increasing the width of the magnetic core 81 in this manner, it is possible to make the permissible transverse deviation of the power acquisition device 80 as great as 2 to 3 m which is a little smaller than the width of a vehicle. This may eliminate the need to control the transverse position of the power acquisition device 80 relative to the power supply device 70.

The power acquisition coil 82 positioned nearest the opposite ends of the magnetic core 72 can be selected by means of an electric switch such as a magnetic contact switch or an electromagnetic switch (e.g., an SCR or a BIMOS) by attaching a magnetic sensor or the like to the power acquisition coils 82. The number of selected magnetic cores can be one or more.

Some of the conventional power acquisition devices employ a plurality of power acquisition coil wires, in which case coils are wound around an E-shaped core member to extend in a horizontal direction. Due to its characteristics, the E-shaped core member has a drawback in that the magnetic flux density of a specific coil, whose distance from the power supply device is the shortest, becomes greatest. Use of the plate-shaped magnetic core 81 in the present invention ensures that the magnetic flux density is kept substantially uniform in all positions, thereby overcoming the drawback noted above. In the present invention, the power acquisition coils 82 can be vertically wound on the plate-shaped magnetic core 81 with a reduced thickness. This makes it possible to strengthen the magnetic coupling between the primary and secondary coils even when the air gap between the magnetic core of the power supply device and the magnetic core of the power acquisition device grows wider. Since the magnetic fields of the power supply tracks tend to be directly applied to the wires of the power acquisition coils, use of a typical plate-shaped conductor may cause eddy current loss. This necessitates use of a litz wire or a laminated body of plate-shaped conductors having a quite narrow width. By doing so, the wires of the power acquisition coils can smoothly perform the function of inducing a secondary voltage in proportion to the magnetic flux of the magnetic core, while allowing the magnetic fields of the magnetic core to pass therethrough with little loss.

The power supply track of a square bracket shape can be installed in place by a method of preliminarily forming a roll of plate-shaped coil track, transporting the same to an installation site and bending the plate-shaped coil track into a square bracket shape at the installation site. At this time, the magnetic field generator and the magnetic core may be cut along the bending lines (or the longitudinal direction). This does not severely deteriorate the magnetic characteristics of the magnetic field generator, because the magnetic field generator extends continuously in the longitudinal direction. As an alternative installation method, the power supply track may be preliminarily formed into a square bracket shape and then transported to the installation site.

When the power supply track of a square bracket shape is buried in the road, there is a possibility that the inner road portion lying inside the power supply track is separated from the outer road portion lying outside the power supply track. Therefore, it is necessary to employ a suitable connector unit for interconnecting the inner road portion and the outer road portion, e.g., a spike having an enlarged head and a flat stem. Alternatively, spikes of a square bracket shape may be driven into the inner road portion and the outer road portion from above to interconnect them, in which case the road is repaved to prevent the spikes from protruding above the surface of the road.

Figure 14:
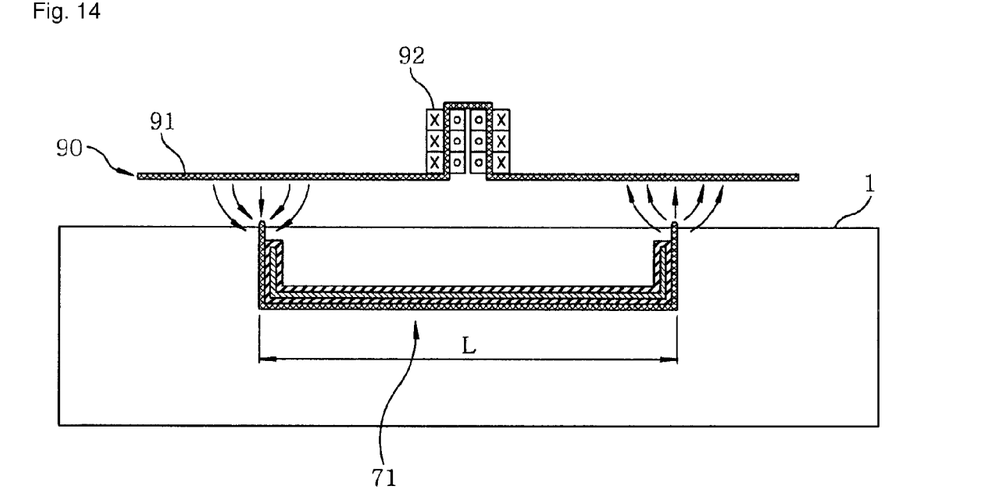
FIG. 14 shows a modification of the ultra slim power acquisition device shown in FIG. 13.

FIG. 14 shows a modification of the ultra slim power acquisition device shown in FIG. 13. Referring to FIG. 14, the ultra slim power acquisition device 90 includes a magnetic core 91 having a central core portion of inverted U-shape and a power acquisition coil 92 wound on the central core portion. The magnetic core 91 of this structure provides a space great enough to increase the area of the power acquisition coil 92, which makes it possible to reduce conductor wire loss. In case where only one power acquisition coil 92 is employed, the permissible transverse deviation of the power acquisition device 90 can be made equal to one half of the width of the power supply track by transversely elongating the magnetic core 91 to have a width twice to the width L of the power supply track 71.

Figure 15:
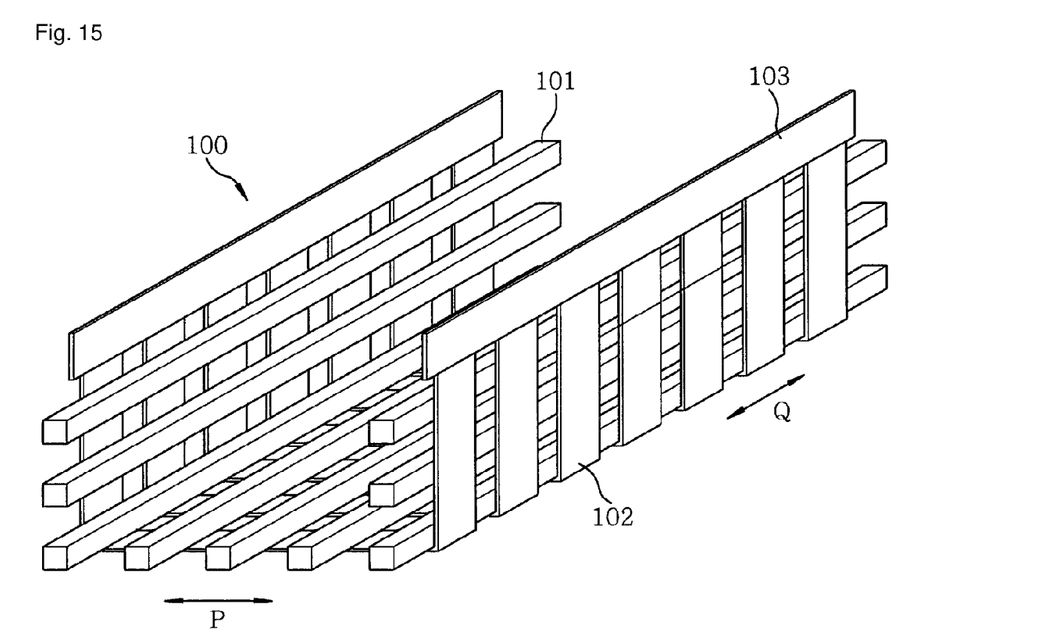
FIG. 15 shows a modification of the ultra slim power supply device shown in FIG. 13.

FIG. 15 shows a modification of the ultra slim power supply device shown in FIG. 13. Referring to FIG. 15, the ultra slim power supply device 100 includes a plurality of magnetic field generators 101 spaced apart at a regular interval in the transverse direction P of the road and a plurality of magnetic cores 102 spaced apart at a regular interval in the longitudinal direction Q of the road. The magnetic field generators 101 and the magnetic cores 102 are arranged in a lattice pattern. The opposite ends of the magnetic cores 102 are connected to one another by end core plates 103. When the power supply device 100 of lattice shape is buried in the road, the inner road portion and the outer road portion are interconnected through the meshes of the power supply device 100. Thus, the power supply device 100 remains embedded in the road at the end of installation. This configuration is somewhat complicated but eliminates the need to interconnect the inner road portion and the outer road portion with an additional connector unit.

The lattice-shaped power supply device can be modified in many different forms. For example, the magnetic cores may be cut into a length ranging from 50 to 100 cm and arranged with a spacing of 5 to 10 cm left therebetween. The magnetic field generators may be divided into two through four pieces and spaced apart by several centimeters. The inner road portion and the outer road portion can be interconnected through the gaps between the magnetic field generators and the magnetic cores. At this time, the magnetic cores and the magnetic field generators can be transported to the installation site in a dismantled state and then assembled together at the installation site. Alternatively, the magnetic cores and the magnetic field generators may be preliminarily assembled together and then transported to the installation site. Only two magnetic field generators may be installed on the bottom surface or on the side surface. The task of installing the magnetic field generators only on the bottom surface is easy to perform but has a disadvantage in that the magnetic flux is leaked through the side cores. If the magnetic field generators are installed only on the side surface, the magnetic flux leaked through the bottom surface is increased a little bit. However, the inner road portion lying inside the core makes contact with the core without going through the magnetic field generators. Thus, the inner road portion shows increased resistance against the pressure applied by the weight of a vehicle. In an effort to enhance the bonding force between the inner and outer road portions, the surfaces of the magnetic field generators and the magnetic cores may be formed into a rugged shape rather than a smooth shape.

As an alternative example, the magnetic field generators and the magnetic cores may be cut into segments and placed on a single plane. The power supply track formed into a planar shape in this manner can be easily transported to the installation site in the form of a roll and then bent into a square bracket shape at the installation site. Alternatively, only the magnetic cores may be formed into a planar shape, in which case the magnetic cores are transported to the installation site in a folded state and then unfolded at the installation site. The lattice-shaped power supply device 100 can be vertically and transversely bent with ease when it is installed in a curved road or a heavily undulating road. If the opposite ends of the magnetic cores 102 are connected by the end core plates 103 extending in the longitudinal direction Q of the road and if the end core plates 103 are exposed on the surface of the road, the lattice-shaped power supply device 100 can make magnetic coupling with the power acquisition device in the same manner as described in connection with FIG. 13.

Figure 16:
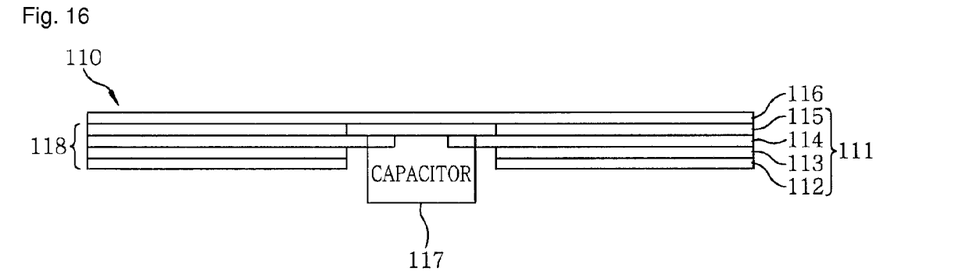
FIG. 16 is a view showing an attachment structure of a serial capacitor in accordance with the present invention.

FIG. 16 is a view showing an attachment structure of a serial capacitor in accordance with the present invention. Referring to FIG. 16, serial capacitors 117 are buried at a regular interval ranging, e.g., from 100 to 200 m in the gap between ultra slim power supply tracks 111, 118 of an ultra slim power supply device 110 including power supply tracks 111, 118 and a protector cover 116 for protecting the power supply tracks 111, 118. The power supply track 111 includes a magnetic core 112, insulating bodies 113 and 115 and a magnetic field generator 114. In this regard, the serial capacitors 117 serve to cancel the alternating voltage induced by serial inductance. A portion of the magnetic field generator 114 opposed to the capacitors is peeled into a naked state. Then, the serial capacitors 117 are fixed to the magnetic field generator by soldering, welding or bolting, after which the fixed portions are molded with an insulating material.

While the invention has been shown and described with respect to the embodiments, it will be understood by those skilled in the art that various changes and modification may be made without departing from the scope of the invention as defined in the following claims.

The invention claimed is:

1. An ultra slim power supply device for supplying power to an electric vehicle in a contactless manner, comprising:
at least one power supply track including a plate or strip shaped magnetic core extending along a road, the magnetic core being in the shape of a square bracket open upward, a magnetic field generator arranged above the magnetic core through which an alternating current is supplied to generate a magnetic field, and an insulating body positioned between the magnetic core and the magnetic field generator to isolate them from each other, wherein the magnetic core is arranged such that two uppermost ends of the magnetic core become coplanar with a surface of the road, and wherein a material having a composition identical to that of the road is filled in an inner space between the uppermost ends.

2. The device of claim 1, further comprising one or more connector members for interconnecting an inner road portion lying inside the inner space and an outer road portion lying outside the magnetic core to thereby fix the power supply track to the road.

3. The device of claim 1, wherein the magnetic core has a substantially same wear resistance as that of the substance used in paving the road.

4. The device of one of claim 1, wherein the magnetic field generator includes a plurality of plate segments spaced apart in a transverse direction of the road, and the magnetic core includes a number of plate-shaped core segments spaced apart in a longitudinal direction of the road, the plate segments and the core segments being arranged in a lattice pattern to form a plurality of meshes through which an inner road portion lying inside the inner space and an outer road portion lying outside the magnetic core are interconnected to fix the power supply track in place.

5. The device of claim 4, wherein the core segments have opposite ends interconnected by end core plates extending in the longitudinal direction of the road.

6. The device of claim 1, wherein a width of at least one of the two uppermost ends of the magnetic core is less than or equal to approximately 1 cm.

7. A power acquisition device incorporated in an electric vehicle and supplied with electric power by electromagnetic induction from a power supply device extending along a road and having opposite ends, the power acquisition device comprising:

a magnetic core installed in the electric vehicle in a spaced-apart relationship with the road; and at least one pair of power acquisition coils winding around the magnetic core, wherein a distance between the coils included in the at least one pair of power acquisition coils is substantially equal to a distance between the two opposite ends of the power supply device.

8. The device of claim 7, wherein the magnetic core has a central core portion of inverted U-shape; and wherein said at least one pair of power acquisition coils winds around the central core portion of the magnetic core.

* * * * *